PULSE FORMING CIRCUIT

Filed Dec. 28, 1944

INVENTOR.
Simeon I. Tourshou
BY
C. D. Tuska
ATTORNEY

Patented Feb. 28, 1950 2,499,234

UNITED STATES PATENT OFFICE 2,499,234

PULSE FORMING CIRCUIT

Simeon I. Tourshou, Philadelphia, Pa., assignor to Radio Corporation of America, a corporation of Delaware Application December 28, 1944, Serial No. 570,129

3 Claims. (Cl. 250—27)

The invention covered herein may be manufactured and used by or for the Government of the United States for any governmental purpose without payment to me or assigns of any royalty thereon.

My invention relates to the production of short electrical pulses of the character employed in radar systems or the like.

An object of the invention is to provide an improved means for producing short electrical pulses that occur in a fixed time relation to the output of a stable sine wave oscillator.

Another object of the invention is to provide an improved means for converting a sine wave signal to periodic electrical pulses.

Still another object of the invention is to provide a simplified circuit for the production of electrical pulses.

According to a preferred embodiment of the invention, a sine wave voltage is applied to the control grid of a screen grid clipper tube that has its anode circuit tuned to a frequency that is high compared with that of the sine wave voltage. A positive D.-C. operating voltage is applied to the screen grid of the clipper tube through a resistor of such high resistance that a large voltage drop is produced thereacross by a flow of screen grid current. However, the screen grid voltage is held at nearly full value for an instant after the start of current flow through the clipper tube (due to clipping of a positive half cycle) by means of a capacitor connected between the screen grid and ground. The capacitor discharge circuit has a fast time constant so that the voltage on the screen grid is held at full value only momentarily and drops to a low value before the termination of the positive half cycle of the sine wave. As a result, the tuned anode circuit is shock excited to produce a large amplitude short pulse only once during each cycle of the applied sine wave voltage; the second pulse (produced at the end of the positive grid period) being of small amplitude so that it has no effect on the circuit output.

Figure 1:
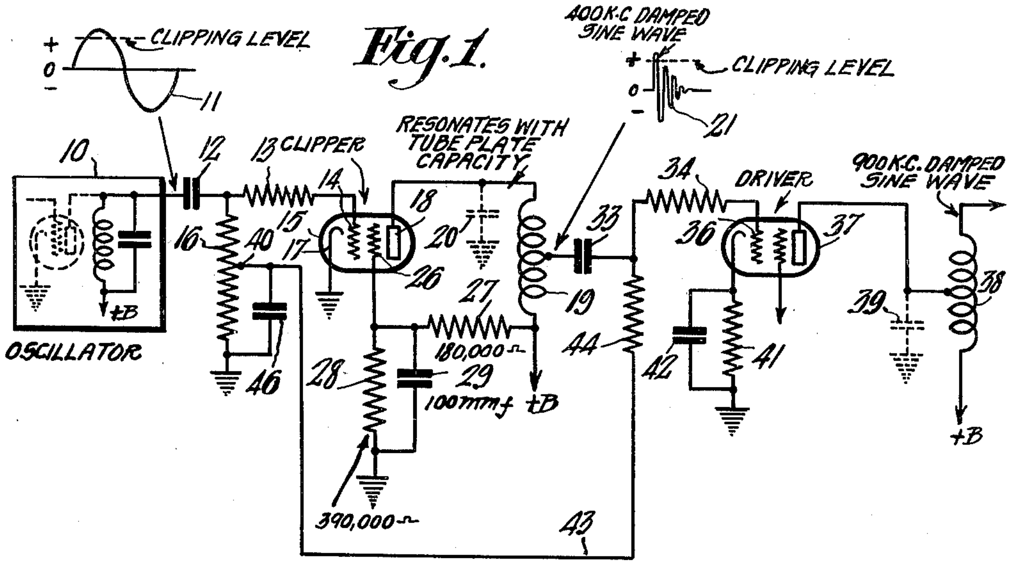
Figure 2:
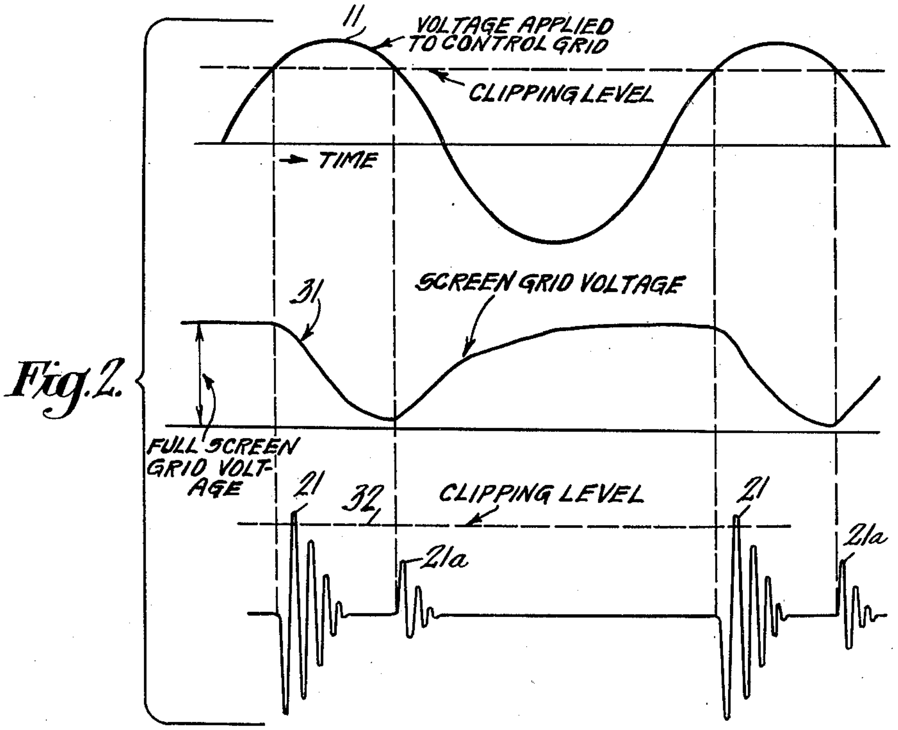

The invention will be better understood from the following description taken in connection with the accompanying drawing in which Figure 1 is a circuit diagram of a preferred embodiment of the invention and Figure 2 is a group of graphs that are referred to in explaining the operation of the circuit shown in Fig. 1.

In Fig. 1, an oscillator 10 applies a periodic voltage 11 through a coupling capacitor 12 and a grid current limiting resistor 13 to the control grid 14 of a screen grid vacuum tube 15. The oscillator 10 preferably is a stable sine wave oscillator such as a crystal controlled oscillator, the voltage 11 then being sinusoidal in wave form. A grid leak resistor 16 is connected between the junction point of capacitor 12 and resistor 13 and ground. The cathode 17 of the tube 14 is grounded.

The values of the coupling capacitor 12 and the leak resistor 16 are such that the tube 15 is negatively biased by the periodic flow of grid current, this commonly being referred to as grid leak biasing. The resulting bias voltage on the grid 14 is sufficient to make the tube 15 clip at the desired voltage level. Since this method of clipping a voltage wave by a grid leak biased tube is well known in the art, it need not be described in detail.

The anode 18 of the tube 15 has anode voltage applied thereto through an inductance coil 19 in the anode circuit. The coil 19 resonates with the tube capacity and stray capacity, indicated at 20, at a comparatively high frequency to produce a damped sine wave 21 when shock excited. The resonant frequency is 400 kilocycles in the specific example being described.

In accordance with the present invention the clipper circuit is so designed that only one large amplitude damped wave 21, one half cycle of which is to be used as a narrow pulse, is produced during one full cycle of the applied sine wave 11. This is accomplished as follows:

Screen grid voltage is applied to the screen grid 26 of the tube 15 through the high resistance resistor 27 of a voltage divider comprising the resistor 27 and a resistor 28, whereby a flow of screen grid current through resistor 27 will cause a large voltage drop thereacross. To prevent the voltage on the screen grid from dropping the instant a flow of screen grid current starts, a filter capacitor 29 is connected between the screen grid 26 and ground. The discharge time constant of the circuit including the capacitor 29 is determined by the value of capacitor 29 and by the screen grid resistance. This time constant is fast compared with the period of the applied wave 11 but is long enough to hold the voltage on the screen grid at nearly full value for a short interval following the start of anode current flow. This is illustrated in Fig. 2 where the graph 31 represents the screen grid voltage. The initial heavy flow of anode current produces the large amplitude damped sine wave voltage 21 across the coil 19. At the termination of the flow of anode current there is produced a small amplitude damped sine wave 21*a*. The peak of wave 21 may then be utilized as a short voltage pulse.

In order to produce a still shorter pulse, the damped sine waves may be applied through a coupling capacitor 33 and through a grid current limiting resistor 34 to the control grid 36 of a vacuum tube 37 having an anode circuit tuned to frequency higher than that of the preceding tuned anode circuit. The tube 37 functions as a clipping tube (clipping at the level 32 indicated in Fig. 2) and as a driver tube for impressing short current pulses upon its tuned anode circuit which comprises an inductance coil 38 and the tube capacity and stray capacity indicated at 39. In the present example, the anode circuit 38—39 is tuned to resonate at 900 kilocycles whereby a damped wave appears thereacross each time it is shock excited. The peak of the first positive half cycle of each damped wave appearing across the coil 38 may be clipped off (by a clipping tube not shown) and the resulting pulses utilized to modulate a radio transmitter.

The tube 37 is biased beyond anode current cut-off so as to pass only the positive peak of the first half cycle of the damped waves 21 whereby the tuned circuit 38—39 is successively shock excited by short current pulses. The bias voltage for the tube 37 may be obtained from a cathode resistor 41 shunted by a capacitor 42 and from a tap 40 on the grid leak resistor 16 of the clipper tube 15. The latter bias voltage is applied to the grid 36 through a conductor 43, a grid leak resistor 44 and the grid current limiting resistor 34. A filter capacitor 46 is connected from the tap 40 to ground to remove pulsations from the biasing voltage.

From the foregoing description it will be seen that I have provided a simple way of producing short duration pulses that occur at the periodic rate of a sine wave oscillator or the like. It will be apparent that a square wave voltage source may be substituted for the sine wave oscillator 10, if desired, although a stable sine wave oscillator is usually preferred. Merely by way of example, the values of several circuit elements are indicated on the drawing in ohms and micro-microfarads.

I claim as my invention:

1. In combination, a vacuum tube having a control grid, a screen grid and an anode, means for applying a periodic voltage of comparatively long duration to said control grid, said voltage periodically exceeding a predetermined positive value, means for applying a direct-current operating voltage to said anode, said tube having an anode circuit that is resonant at a frequency that is high compared with the periodic rate of said periodic voltage, means for biasing said tube beyond anode current cut-off in the absence of a voltage on said control grid that exceeds said predetermined positive value, means for applying a direct-current voltage to said screen grid through a resistor of sufficiently high resistance to cause a large voltage drop thereacross when there is a flow of screen grid current, and a capacitor connected between said screen grid and ground, the time constant of the discharge path for said capacitor being short compared with the periodic rate of said periodic voltage, said discharge path being through the internal impedance of said tube.

2. In combination, a vacuum tube having a control grid, a screen grid and an anode, means for applying a sine wave voltage to said control grid, said voltage periodically exceeding a predetermined positive value, means for applying a direct-current operating voltage to said anode, said tube having an anode circuit that is resonantt at a frequency that is high compared with the frequency of said sine wave, means for biasing said tube beyond anode current cut-off in the absence of a voltage on said control grid that exceeds said predetermined positive value, means for applying a direct-current voltage to said screen grid through a resistor of sufficiently high resistance to cause a large voltage drop thereacross when there is a flow of screen grid current, and a capacitor connected between said screen grid and ground, the time constant of the discharge path for said capacitor being short compared with the period of said sine wave voltage, said discharge path being through the internal impedance of said tube.

3. In combination, a vacuum tube having a control grid, a screen grid and an anode, means for applying a sine wave voltage to said control grid, said voltage periodically exceeding a predetermined positive value, means for applying a direct-current operating voltage to said anode, said tube having an anode circuit that is resonant at a frequency that is high compared with the frequency of said sine wave, means for biasing said tube beyond anode current cut-off in the absence of a voltage on said control grid that exceeds said predetermined positive value, means for applying a direct-current voltage to said screen grid through a resistor of sufficiently high resistance to cause a large voltage drop thereacross when there is a flow of screen grid current, a capacitor connected between said screen grid and ground, the time constant of the discharge path for said capacitor being short compared with the period of said sine wave voltage whereby a single large amplitude damped sine wave train is produced in said resonant anode circuit during each cycle of the applied sine wave voltage, said discharge path being through the internal impedance of said tube, and clipping means for passing only the peak voltage of one cycle of said damped wave whereby a single short voltage pulse per cycle of the applied sine wave is obtained.

SIMEON I. TOURSHOU.

REFERENCES CITED

The following references are of record in the file of this patent:

UNITED STATES PATENTS

| Number | Name | Date |
|---|---|---|
| 1,695,042 | Fearing | Dec. 11, 1928 |
| 2,103,090 | Plebanski | Dec. 21, 1937 |
| 2,153,202 | Nichols | Apr. 4, 1939 |
| 2,181,309 | Andrieu | Nov. 28, 1939 |
| 2,236,705 | Campbell | Apr. 1, 1941 |
| 2,237,661 | Ernst | Apr. 8, 1941 |
| 2,396,476 | Schade | Mar. 12, 1846 |
| 2,411,166 | Olson | Nov. 19, 1946 |
| 2,414,323 | Moe | Jan. 14, 1947 |
| 2,418,425 | Roch | Apr. 1, 1947 |
| 2,420,013 | Rajchman | May 6, 1947 |